(12) United States Patent
Patton et al.

(10) Patent No.: US 10,178,731 B2
(45) Date of Patent: Jan. 8, 2019

(54) SYSTEMS AND METHODS FOR REDUCING ENERGY REQUIREMENTS OF AN ELECTRIC LIGHT

(71) Applicant: Luminara Worldwide, LLC, Eden Prairie, MN (US)

(72) Inventors: Douglas Patton, Irvine, CA (US); Kanchana Sanjaya Gunesekera Karunaratne, Escondido, CA (US)

(73) Assignee: LUMINARA WORLDWIDE, LLC, Eden Prairie, CA (US)

( * ) Notice: Subject to any disclaimer, the term of this patent is extended or adjusted under 35 U.S.C. 154(b) by 0 days.

(21) Appl. No.: 15/349,671

(22) Filed: Nov. 11, 2016

(65) Prior Publication Data

US 2017/0135172 A1    May 11, 2017

Related U.S. Application Data

(60) Provisional application No. 62/303,180, filed on Mar. 3, 2016, provisional application No. 62/253,960, filed on Nov. 11, 2015.

(51) Int. Cl.
*H05B 33/08* (2006.01)
*F21Y 115/10* (2016.01)
*F21S 10/04* (2006.01)

(52) U.S. Cl.
CPC ..... *H05B 33/0851* (2013.01); *H05B 33/0815* (2013.01); *F21S 10/04* (2013.01); *F21Y 2115/10* (2016.08); *Y02B 20/347* (2013.01)

(58) Field of Classification Search
CPC .... H05B 37/02; H05B 33/08; H05B 33/0815; H05B 33/0818; H05B 33/0845; H05B 33/0851; H05B 33/086

USPC ............ 315/185 R, 192, 291, 297, 307, 312
See application file for complete search history.

(56) References Cited

U.S. PATENT DOCUMENTS

| | | | |
|---|---|---|---|
| 6,816,919 B2 | 11/2004 | Gareis et al. | |
| 6,882,551 B2* | 4/2005 | Shimada | H02M 1/4225 363/79 |
| 8,963,535 B1 | 2/2015 | Melanson | |
| 9,131,583 B2* | 9/2015 | Zhang | H05B 33/0815 |
| 2002/0048177 A1* | 4/2002 | Rahm | H01L 25/0753 362/555 |

(Continued)

FOREIGN PATENT DOCUMENTS

WO         2013003332 A2        1/2013

OTHER PUBLICATIONS

International Preliminary Report on Patentability for PCT Application No. PCT/US2016/061636, dated May 24, 2018; 17 pgs.

*Primary Examiner* — Thai Pham
(74) *Attorney, Agent, or Firm* — Umberg Zipser LLP

(57) ABSTRACT

Systems and methods of driving a light source, such as a light emitting diode (LED), while minimizing power consumption. Different techniques can be implemented in circuits that eliminate the traditional need for a sense resistor. By eliminating the sense resistor, a LED driving circuit's efficiency can be improved by up to and exceeding 30%. A pulse-width modulator can be used to control current flow in a buck, boost, or buck-boost circuits. Many of the configurations discussed eliminate the need for a sense resistor, which needlessly dissipates power. Others use a sense resistor minimally compared to traditional LED driving circuits.

12 Claims, 13 Drawing Sheets

(56) References Cited

U.S. PATENT DOCUMENTS

| | | | |
|---|---|---|---|
| 2006/0261752 A1* | 11/2006 | Lee | H05B 33/0857 315/291 |
| 2009/0020685 A1 | 1/2009 | Lin | |
| 2009/0284237 A1* | 11/2009 | Kitagawa | H02M 3/156 323/282 |
| 2010/0052569 A1* | 3/2010 | Hoogzaad | H05B 33/0818 315/294 |
| 2010/0283322 A1* | 11/2010 | Wibben | H02M 3/158 307/31 |
| 2011/0127921 A1 | 6/2011 | Lin et al. | |
| 2011/0148324 A1* | 6/2011 | Du | H05B 33/0812 315/297 |
| 2011/0254524 A1* | 10/2011 | Ishii | H02M 3/156 323/282 |
| 2013/0241442 A1 | 9/2013 | Trattler | |
| 2015/0015153 A1 | 1/2015 | Duan et al. | |

* cited by examiner

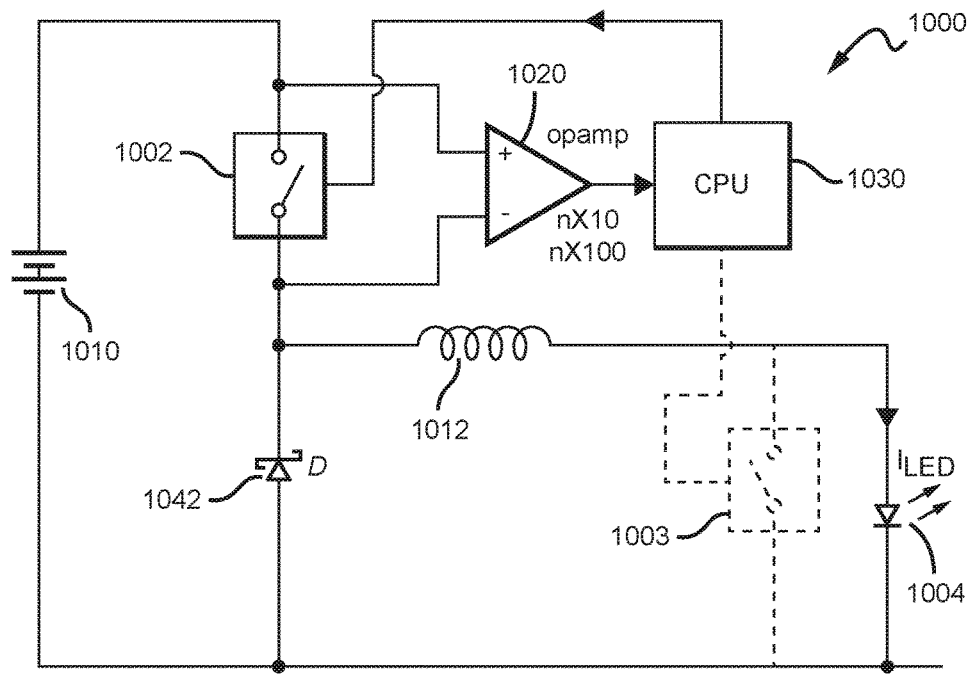
FIG. 10
FIG. 11
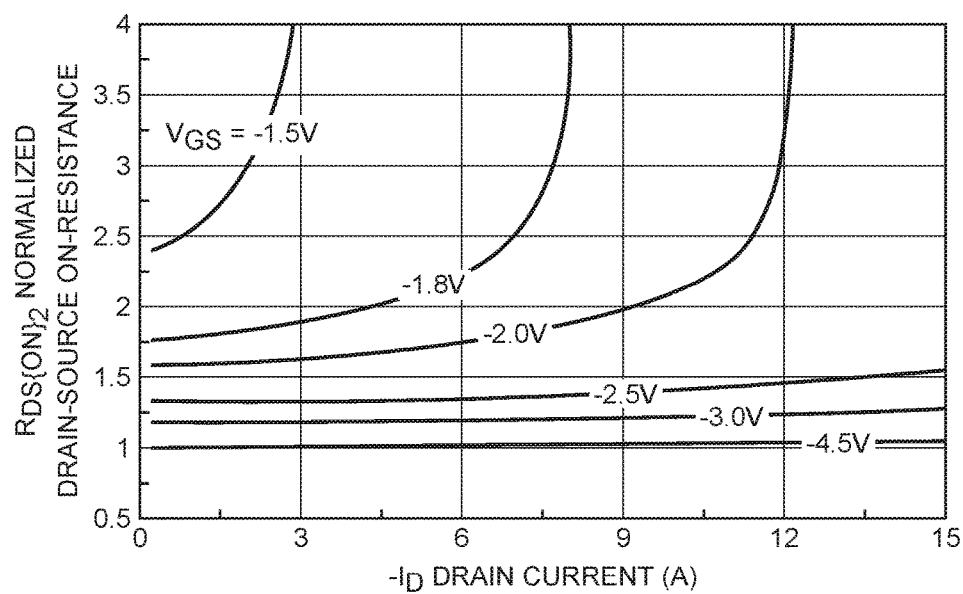

SYSTEMS AND METHODS FOR REDUCING ENERGY REQUIREMENTS OF AN ELECTRIC LIGHT

This application claims priority to U.S. provisional application having Ser. No. 62/303,180, filed Mar. 3, 2016, and also to U.S. provisional application having Ser. No. 62/253,960, filed Nov. 11, 2015. All extrinsic materials identified herein are incorporated by reference in their entirety. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The present invention relates to methods and systems for reducing energy consumption and requirements of an electric light.

BACKGROUND

The background description includes information that may be useful in understanding the present invention. It is not an admission that any of the information provided herein is prior art or relevant to the presently claimed invention, or that any publication specifically or implicitly referenced is prior art.

A constant voltage driver for a light emitting diode (LED) is generally more energy-efficient compared to a constant current driver, when implemented using a traditional DC-DC converter. For example, a typical white light LED with a forward voltage of 3.0 V run using 12 mA of current might provide a constant voltage driver of 3.3 V to the LED. The constant voltage driver may include a small 25Ω sense resistor (R=V/I; 0.3 V/0.012 A) in series with the LED, which uses about 3.6 mW (e.g., P=IV; 0.012 A×0.3 V). In comparison, a constant current driver would require 1.2 V instead of 0.3 V at the sense resistor. For 12 mA of current to pass to the LED using a constant current driver, a series resistor of 100Ω (R=V/I; 1.2 V/0.012 A) would be required. Unfortunately, such circuit typically dissipates approximately 14-15 mW in the resistor (e.g., P=I$^2$R; 0.012$^2$ A× 100 Ω=14.4 mW). The resistor in both cases (i.e., constant current driver and constant voltage driver) is entirely parasitic and used purely to control the amount of current flowing to the LED to cause the LED to produce consistent lighting.

Such energy waste can be measured by comparing resistor power dissipation to LED power dissipation. For example, a LED in these examples would likely dissipate approximately 36 mW (e.g., P=IV; 0.012 A×3.0 V). In contrast, the resistor in a constant current driven circuit would likely dissipates about 14 mW, while the resistor in a constant voltage driven circuit would likely dissipates about 1.4 mW. Thus, the sense resistor in the constant current LED driver circuit wastes about 28% of the total power dissipated by the circuit, and the sense resistor in the constant voltage LED driver circuit wastes about 9% of its energy, where waste is calculated by dividing by the power dissipated by the sense resistor by the total power consumed by the circuit (e.g., power dissipated by the LED plus power dissipated by the sense resistor).

But a serious issue with the more efficient constant voltage version is that part-to-part variations in the LED forward voltage required to illuminate the component can result in large changes in the LED current. Also, the voltage is affected by environments surrounding the LED. For example, temperature changes can affect voltage drop with similar negative results. A 0.1 V variation in the LED forward voltage could either double the LED current in a particular circuit or even decrease the current to 50% of its expected value, resulting in a dimly lit LED.

Although a slightly higher resistance sense resistor can be used with the LED can so that part-to-part variations will be less sensitive to the LED current. However, increasing the resistance of the sense resistor can lead to additional power waste reducing the power efficiency of the circuit.

Thus, there is still a need for improved methods and systems for reducing energy consumption and requirements of an electric light.

SUMMARY OF THE INVENTION

The present invention provides apparatus, systems, and methods for reducing energy consumption and requirements of an electric light through novel circuits. In one aspect of the inventive subject matter, the inventors contemplate a circuit for an electric candle that includes a switch coupled with an electric light, a resistor coupled with the electric light, and a comparator coupled with the resistor. In some embodiments, the electric light can be an LED or it can be a plurality of LEDs coupled together (e.g., in parallel or in series). In some embodiments, the electric light can be driven in a constant current mode.

Throughout this application, the term "switch" may be used, and should be interpreted to include transistors, relays, or any other type of electronic switch.

In some contemplated embodiments, the circuit can include a processor coupled with a comparator, and the processor can modulate the switch in the circuit. The circuit can include a second switch that is coupled with the electric light. In embodiments with a processor, the processor can be coupled to with the second switch as well as the first switch, and the processor can be configured to modulate the second switch.

In still further embodiments, the circuit can include a fixed divider coupled with the comparator. The circuit can also include a coil coupled with the electric light. In other embodiments, it can include a power source (e.g., a battery) and that power source can include lithium (e.g., a lithium battery) or an alkaline electrolyte (e.g., an alkaline battery), for example.

In another aspect of the inventive subject matter, methods of increasing electrical efficiency for an electric candle are contemplated, which include (1) providing a circuit having a comparator, a switch, and an electric light, and (2) modulating the switch based on the output of the comparator.

Additional methods are also contemplated for reducing power consumption in an LED driving circuit that include (1) providing the LED driving circuit comprising a first coil, a second coil, and an LED, where the first coil and the second coil form a transformer, (2) measuring a voltage in the second coil generated by the first coil, (3) using the voltage in the second coil to determine an amount of current passing to the LED, and (4) adjusting the circuit to change the amount of current passing to the LED.

Still additional contemplated methods for reducing power consumption in an LED driving circuit comprise the steps of: (1) providing the LED driving circuit comprising a transistor and an LED, (2) measuring a voltage drop across the transistor, (3) using the voltage drop across the transistor to determine an amount of current passing to the LED, and (4) adjusting the circuit to change the amount of current passing to the LED.

In another aspect of the inventive subject matter, methods of reducing power consumption in an LED driving circuit include (1) providing the LED driving circuit comprising a battery and an LED, (2) determining an internal equivalent resistance of the battery, (3) using the internal equivalent resistance of the battery to determine an amount of current passing to the LED, and (4) adjusting the LED driving circuit to change the amount of current passing to the LED.

In yet another aspect, methods of reducing power consumption in an LED driving circuit can include (1) providing the LED driving circuit comprising a photosensor and an LED, (2) using the photosensor to measure a brightness of the LED, and (3) adjusting the LED driving circuit to change the brightness the LED.

Another contemplated method comprises (1) providing the LED driving circuit comprising an IC component and a Hall effect sensor, (2) using the Hall effect sensor to measure a magnetic field from the IC component, (3) using the magnetic field measurement to determine an amount of current passing to the LED, and (4) adjusting the LED driving circuit to change the amount of current passing to the LED.

Other methods of reducing power consumption in an LED driving circuit include (1) providing the LED driving circuit comprising a sense resistor, a transistor, and an LED, (2) using the sense resistor to determine an amount of current passing to the LED, (3) activating the transistor to remove the sense resistor from the LED driving circuit, and (4) adjusting the LED driving circuit to change the amount of current passing to the LED.

In embodiments that include an LED driving circuit, the LED driving circuit can be a buck-boost LED driver. In embodiments that include the step of adjusting the LED driving circuit, that adjustment can be accomplished using a pulse-width modulator.

Switching MOSFETs on and off "strongly" requires a high gate voltage. As the battery voltage starts to drop the gates start to switch "less strongly" and this leads to a lower efficiency because the MOSFET "on" resistance is now a loss factor. As the $V_{bat}$ starts to drop the MOSFET $RDS_{on}$ (on resistance) increases due to poor gate drive. To counteract this, the output voltage is fed back to the "CPU" voltage supply pin to increase the CPU voltage available to drive the MOSFET gates once the led drive circuit is active. Thus we start the device using even 1.8 v (battery voltage when discharged) and then once the switching starts with a simple diode selector we feed the processor with the higher output voltage which then enables the MOSFET drive efficiency to increase.

Various objects, features, aspects and advantages of the inventive subject matter will become more apparent from the following detailed description of preferred embodiments, along with the accompanying drawing figures in which like numerals represent like components.

BRIEF DESCRIPTION OF THE FIGURES

FIG. 10 illustrates an LED driving circuit capable of reducing energy usage by measuring a voltage drop across a transistor to deduce current passing to an LED.

FIG. 11 is a graph demonstrating the relationship between drain current and transistor drain-source on-resistance

DETAILED DESCRIPTION

Figure 1:
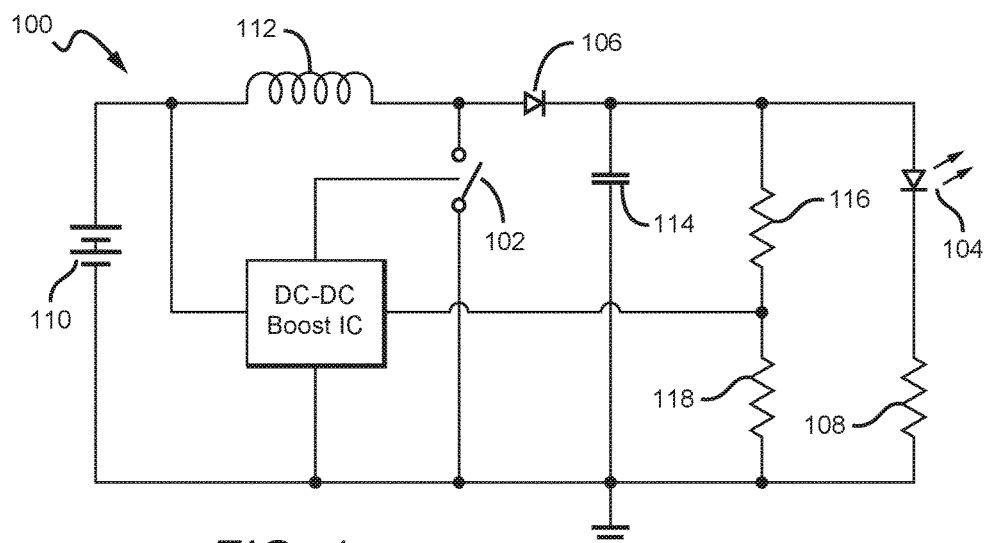
FIG. 1 illustrates a schematic diagram of an LED circuit that uses a traditional boost converter having one switch.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

One should appreciate that the disclosed subject matter provides many advantageous technical effects including reducing energy consumption of an electric light to increase the lifespan of batteries, for use in, for example, flameless, electronic candles.

One aspect of the present invention includes a circuit for an electric candle. Preferred circuits include a two-switch boost converter, a series of resistors coupled with an electric light (e.g., an LED), and a gain block coupled with the series of resistors. Feedback in the circuit based on LED current may be implemented. Such a control system makes continuous adjustments, or it can make adjustments periodically to reduce current loss incurred during observation.

FIG. 1 shows a circuit 100 that uses a traditional boost converter having one switch 102, which imposes several disadvantages in energy consumption. For example, in this circuit 100, the LED 104 is not driven in constant current mode. As an example, the circuit 100 can include 2 alkaline cell batteries as a power source 110 providing 3 V initial voltage. Circuit 100 can also include inductor 112 and capacitor 114, as well as resistors 116 and 118. Thus, some part-to-part variations in the LED 104 forward voltage drop or any environmental changes (e.g., surrounding temperature, etc.) may make large changes in the LED current. In addition, circuit 100 has two parasitic power losses: DC-DC diode 106 and series LED resistor 108. Furthermore, in circuit 100, the $P_{LED}$ (power dissipated by the LED) is 38 mW, and the power dissipated in the diode 106 and series resistor 108 is 11 mW (5 mW+6 mW, respectively), which results in a total power loss of around 22% of total power consumed in circuit 100.

Figure 2:
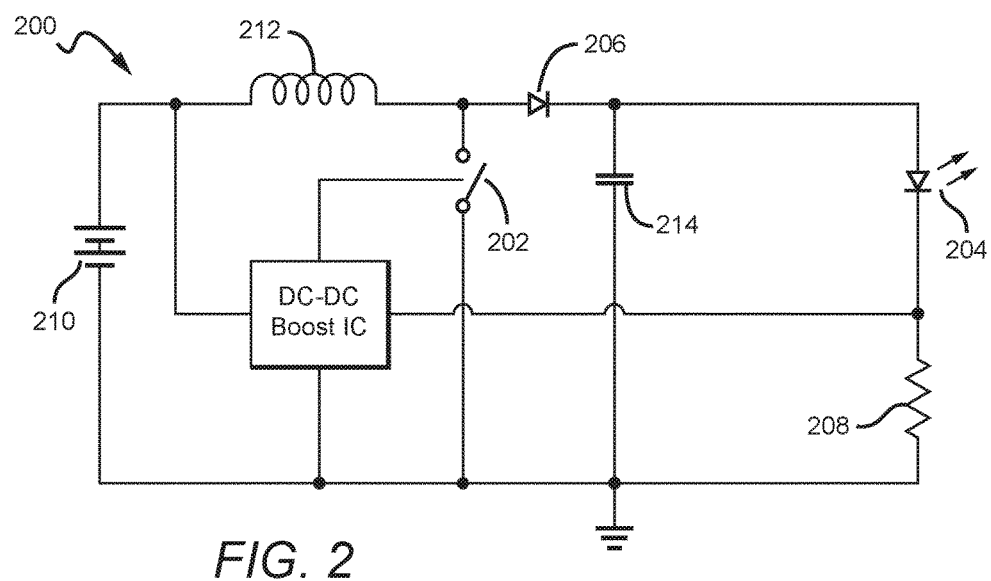
FIG. 2 illustrates a schematic diagram of an LED circuit using a constant current mode.

FIG. 2 shows an improved exemplary circuit 200 that implements a constant current mode. While the constant current mode circuit may reduce or prevent voltage drop that changes the current of the LED 204, a typical constant current mode circuit generally consumes more energy. In this exemplary circuit, the power loss is around 15-20 mW, which is about 28%-35% of total power consumed in this circuit. Like FIG. 1, circuit 200 also includes inductor 212 and capacitor 214, but eliminates the additional resistors of circuit 100. With respect to the remaining numerals in FIG. 2, the same considerations for like components with like numerals of FIG. 1 apply.

Figure 3:
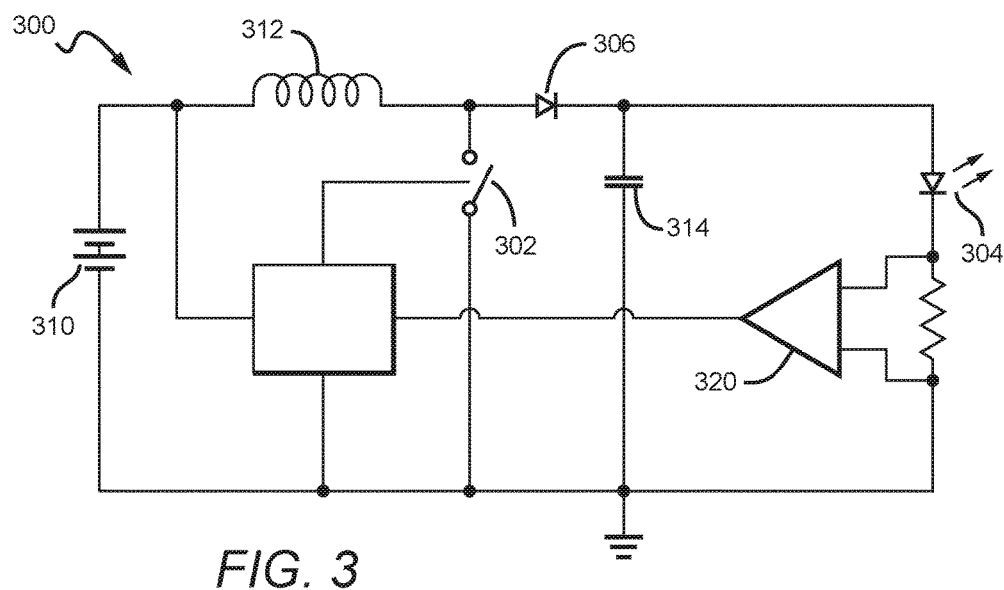
FIG. 3 illustrates a schematic diagram of an LED circuit using a direct current (DC)-to-DC integrated circuit.

FIG. 3 shows a schematic diagram of an exemplary LED circuit 300 using a direct current (DC)-to-DC integrated circuit. DC to DC converters are frequently used in portable electronic devices such as cellular phones and laptop computers, which are primarily supplied with power from batteries. Such electronic devices often contain several sub-circuits, each with its own voltage level requirement that is different from that supplied by the battery or an external supply (sometimes higher or lower than the supply voltage). Additionally, the battery voltage declines as its stored energy is drained. Switched DC to DC converters offer a method to increase voltage from a partially lowered battery voltage, which thereby saves space by eliminating multiple batteries to accomplish the same thing.

Like circuit 200, circuit 300 also includes switch 302, LED 304, diode 306, inductor 312, and capacitor 314. However, the LED circuit 300 preferably includes a gain block amplifier in place of the series LED resistor 208 of circuit 200. By installing a gain block in circuit 300, power losses at the series resistor can be significantly reduced. In some embodiments, circuit 300 can include an operational amplifier 320. An operational amplifier (op-amp) is a DC-coupled high-gain electronic voltage amplifier with a differential input and, usually, a single-ended output. In the circuit shown in FIG. 3, the addition of a low power op-ampr 320 with a rail to rail output (e.g., OPA348-Q1) could add a 45 µA quiescent draw. In total, the power loss is reduced to approximately 5.5 mW (5 mW+312 µW+3×45 µA), which is about 12% of total power consumed in circuit 300. With respect to the remaining numerals in FIG. 3, the same considerations for like components with like numerals of FIG. 1 apply.

Figure 4:
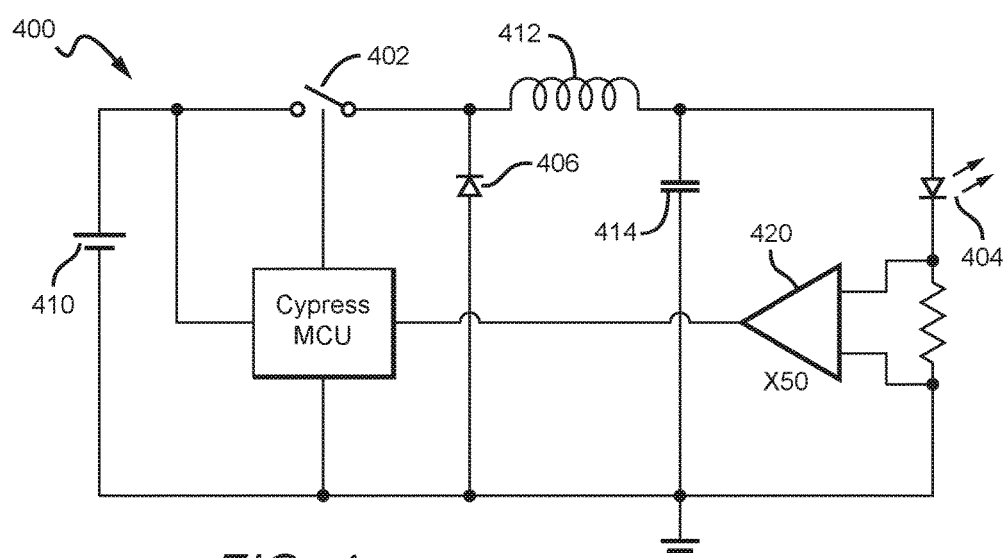
FIG. 4 illustrates a schematic diagram of an LED circuit using a two switch boost converter.

FIG. 4 shows a schematic diagram of an LED circuit 400 using a two switch boost converter. Because circuit 400 does not use a traditional DC-DC converter integrated circuit (IC) and rectification is provided by the LED 404, circuit 400 can reduce parasitic loss from the diode 406 while also reducing required board space. Further, because DC-DC converter IC cost is generally greater than the cost of the switch 402 and the op-amp 420, the circuit 400 can be less costly. When evaluating circuit 400, the inventors unexpectedly discovered that the energy consumption was drastically reduced in the LED path. In total, the power loss was around 200 µW, which is about 0.5% of total power consumed in circuit 400, when compared with other solutions. Such reduction of power loss advantageously can increase the circuit life up to an additional 20%, thereby increasing the battery life of the device or allowing for smaller batteries to be used. With respect to the remaining numerals in FIG. 4, the same considerations for like components with like numerals of FIG. 3 apply.

Figure 5:
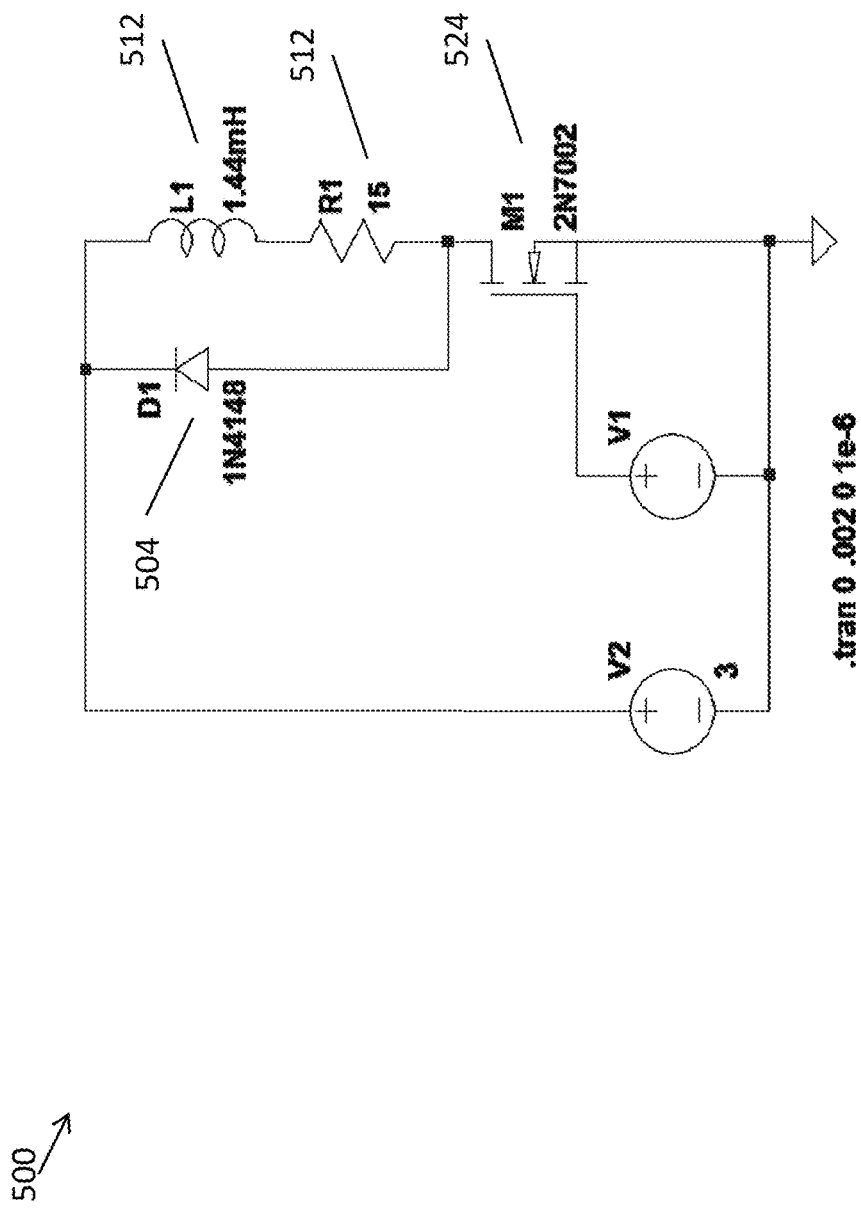
FIG. 5 illustrates a schematic diagram of an LED circuit using a coil.

Another aspect of the present invention includes a method of increasing electrical efficiency for an electric candle that includes the step of providing a circuit 500 having a transistor 524, a coil 526 and an electric light 506. One exemplary circuit is shown in FIG. 5. The method further requires pulsing the coil at a frequency of, for example, at least 10 KHz. In a preferred embodiment, the pulsing is switched between an on mode and an off mode for first and second time periods. With respect to the remaining numerals in FIG. 5, the same considerations for like components with like numerals of FIG. 1 apply.

A normal coil drive circuit has a series resistor, usually in the 150Ω to 330Ω range, in the coil circuit. The voltage to the coil is switched on and left on for typically 220 milliseconds, following the standard coil drive waveform (220 milliseconds on, 375 milliseconds off, etc.). The coil DC reactance at the same duty cycle discussed above is typically 15Ω and the inductance is measured as 1.44 mH. Yet, this drive technique dissipates much more power in the series resistor than in the coil by a factor of R/reactance of the coil (e.g., R/15) times, where R is the value of the external series resistance and 15 is the resistance of the coil. As an example, if the series resistance is 150Ω, there is 10 times more power being wasted in the series resistance than going to the coil's magnetic field.

Pulsing the coil at a high frequency using pulse-width modulation (PWM) may be used to reduce power consumption or waste in the circuit 500. Pulse-width modulation, or pulse-duration modulation (PDM), is a modulation technique used to encode a message into a pulsing signal. Although this modulation technique can be used to encode information for transmission, its main use is to allow the control of the power supplied to electrical devices.

When pulsing a coil, it is contemplated that switching at rates higher than normal human hearing is important because the candle wick and the coil could otherwise form a speaker. The inventors found that the inductance of the standard coil is well suited for switching at 20 KHz. The inductance is in the ideal range to be pulsed at that frequency without saturating the coil's magnetic field.

Figure 6:
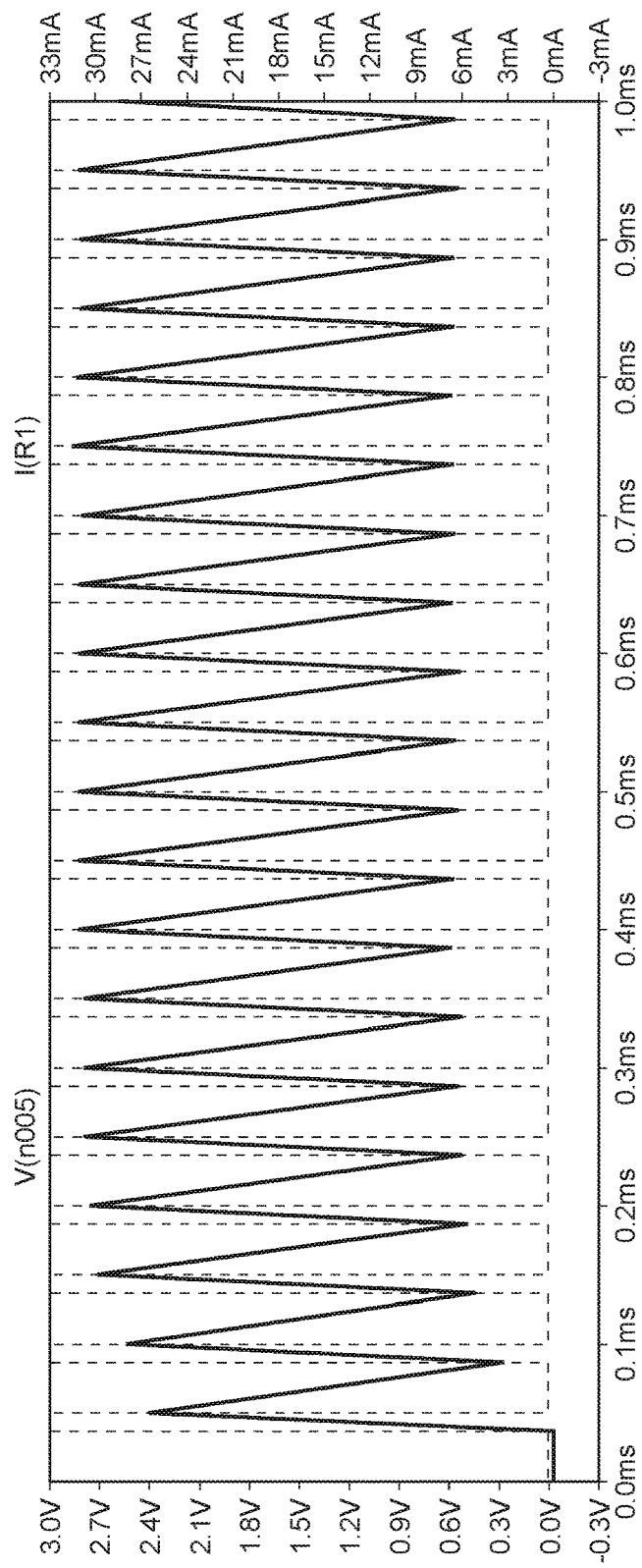
FIG. 6 illustrates a graph of voltage and coil current during simulation of pulsing the coil with a high frequency.

The circuit shown in FIG. 5 was simulated in PSpice. FIG. 6 shows drive voltage and the coil current simulation results. As shown, the average coil current is 18 mA, which is similar to existing candles that are not using a PWM drive. However, the averaged battery current is only 5.2 mA. Thus, this technique could reduce the coil battery current by an order of 3 times, and a power savings of $3^2$ or 9 times.

Since the candle waveform corresponds to a standard coil drive waveform (for example, 220 milliseconds on, 375 milliseconds off), the average coil on time is about 37%, while ignoring the gap that may occur after every 15th or so pulse. Therefore, the existing coil drive circuit has an average battery current of 37% of 18 mA, which is 6.7 mA. The PWM switching drive circuit will have an average battery current of 37% of 5.2 mA, which is 1.9 mA, saving about 5 mA of average battery current.

An equivalent circuit was built and tested using a standard 3.5 inch electric candle. Having several ears with acute high frequency sensitivity listening in a quiet room, no sounds could be heard. The coil current was as predicted in the PSpice simulations.

In some embodiments, it is contemplated that an LED circuit using a two switch boost converter can also have a coil, with the coil pulsed at a frequency of, for example, at least 10 KHz. Under such configuration, the battery life of the candle can be improved about 30% or more by combining two methods described above.

Figure 7:
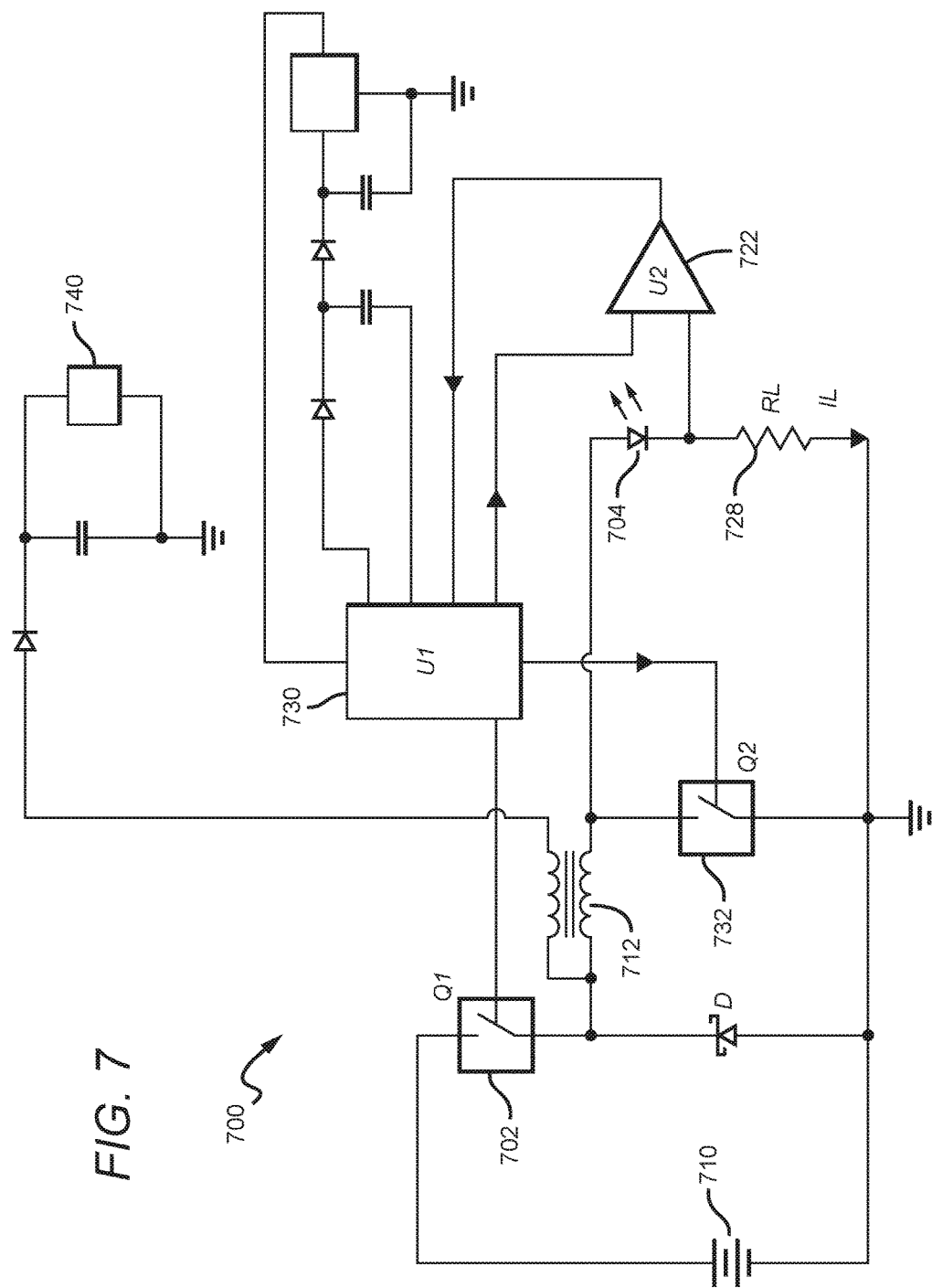
FIG. 7 illustrates an LED circuit using a comparator.

It is further contemplated that a comparator can be used to control the current in a LED. FIG. 7 depicts circuit 700 using a comparator 722. Using comparator 722 in place of, for example, an operational amplifier (op-amp) gain stage can provide a 75% cost savings with reduced voltage requirements and reduced power consumption. As depicted, the comparator 722 can be used to set the current to the LED 704 by comparing the average voltage on a resistor 728 (depicted $R_L$) to a fixed resistor divider from a regulated reference source (not depicted) or to a digital-to-analog converter (DAC) output of a processor (depicted CPU 730).

It is contemplated comparing average voltage on a resistor to a DAC output of processor 730 can include software based LED brightness control.

In some embodiments, it is contemplated that a rectifier diode and smoothing capacitor may be included. However, in some preferred embodiments, the LED itself can function as a rectifying element. This permits the removal of standard rectifier diodes and smoothing capacitors which beneficially reduces parasitic loss in the circuit, reduces total parts count, reduces cost, and reduces power consumption.

It is contemplated that circuits as depicted in FIG. 7 include a power source 710. The power source 710 may have a voltage potential greater than the voltage requirement of LED 704. In these instances, it is desirable to reduce the voltage closer to the LED voltage requirement. In some embodiments, the power source 710 comprises a lithium power source, such as a lithium polymer, lithium pouch, or cylindrical lithium cell. Such lithium power sources can have a 2.5 V to 4.2 V potential. Some LEDs have a range of voltage requirements from 1.8 V to 3.3 V.

The circuit of FIG. 7 can be used to reduce the voltage from the power source 710 to better match the voltage requirement of LED 704. Switch 702 is opened for a period of time permitting current to flow through inductor 712 and into LED 704 and subsequently the resistor $R_L$ 728. The comparator 722 can include a filtering network on its input to create an average of the current waveform. It is contemplated that the comparator 722 compares the average voltage on the resistor 728 with reference voltage from a DAC output on the CPU 730 (i.e. processor). Based on the output from the comparator 722, the CPU 730 opens or closes switch 702 to supply a steady controlled current to the LED 704 and a voltage approximate to the voltage requirement of LED 704. It is contemplated that through the use of low voltage reference levels, a small resistor $R_L$ (e.g., 0.1 to 0.5 Ω, 0.3 to 0.8 Ω, 0.7 to 1 Ω, 1 to 3 Ω, 3 to 6 Ω, 5 to 9 Ω, 8 to 10 Ω, 10 to 15 Ω, 14 to 20Ω, and 19 to 30Ω) can be used to stabilize the circuit.

As shown in FIG. 7, a linked inductor 712 is used. As used herein, the term "linked inductor" is defined as an inductor in which there are two separate windings that are around the same magnetic core. A magnetic pulsed field in one winding induces a complementary voltage/power function in the second winding (like a transformer). In contrast, an "unlinked inductor" has separate components which do not share a field.

The turns ratio of the inductor 712 can be adjusted to 140:100 to alter power transfer function to the fan motor 740. This contrast prior configuration where fan 740 was connected directly to the same signal as the LED 704, with the LED in very low power scenarios sometimes operating on sub 3 V voltages (LED at 6-8 ma). Such configuration led to a slower than desirable fan speed.

To increase the fan speed while minimizing extra components and maintaining a highly efficient circuit, the linked inductor 712 can be used where the magnetic energy can be asymmetrically split according to the turns ratio. This advantageously allows more energy to the fan motor 740, thereby keeping airflow at an acceptable level while keeping the LED 704 at an acceptable brightness to meet overall battery life parameters and effect. The benefit of the configuration of circuit 700 is that the fan speed is stable over a wide range of battery voltage because the switches 702 and 732 are controlled to keep LED 704 power constant and due to the linked nature of the inductor 712 also serves to keep fan power constant.

Figure 8:
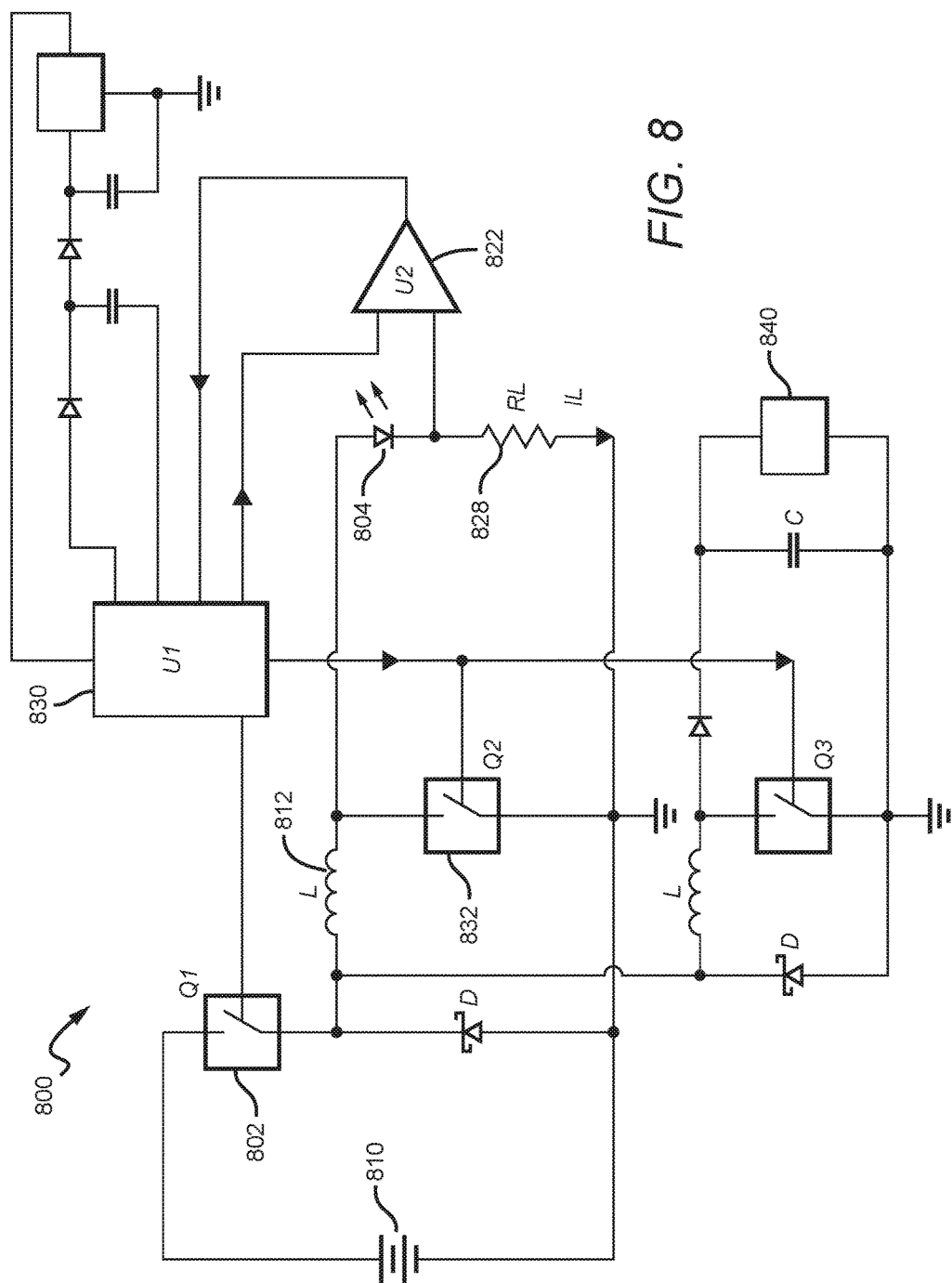
FIG. 8 illustrates an LED circuit using a two switch boost converter and a comparator.

FIG. 8 depicts a circuit 800 using a two-switch booster and a comparator 822. It is contemplated that circuit 800 includes a power source 810. In some embodiments, the power source may have a voltage that is potentially less than the voltage requirement of LED 804. In these embodiments, it is desirable to increase the voltage received by the LED 804 to satisfy the voltage requirement. In some embodiments, the power source 810 comprises an alkaline electrolyte, such as a zinc and manganese oxide cell. Such power sources can have a 2.0 V to 3.3 V potential, while some LEDs have a voltage requirements ranging from 2.7 V to 3.1 V.

Circuit 800 can increase the voltage received by the LED 804 such that it satisfies the voltage requirement of the LED 804. In such embodiments, switch 802 is closed permitting current to pass through the inductor 812, LED 804, and resistor 828. The comparator 822 and CPU 830 of FIG. 8 operate similarly as in FIG. 7. The CPU 830 also controls switch 832, and modulates opening and closing to change the voltage received by the LED 804.

As shown in FIG. 8, circuit 800 has an unlinked inductor 812 which has a similar turns ratio increase (1.4×) as inductor 712 and uses a second set of switches that are operated by the same signals. In many ways, circuit 800 is similar to circuit 700 but includes a few additional components while retaining the same controlled low power benefits.

It is contemplated circuit 800 can extend the life of power source 810 by approximately 30%. For power sources having 3.0 V potential, a standard circuit not incorporating the comparator and switches Q1 and Q2 has an average current draw (ACD) of 34 mA, while circuit 800 has an ACD of 23 mA, a 32% improvement. For power sources having 2.5 V potential, a standard circuit not incorporating the comparator and switches Q1 and Q2 has an ACD of 38 mA, while the circuit 800 has an ACD of 26 mA, a 32% improvement. For power sources having 2.0 V potential, a standard circuit not incorporating the comparator and switches Q1 and Q2 has an ACD of 48 mA, while circuit 800 has an ACD of 37 mA, a 23% improvement. It is contemplated that circuit 800 offers 23%-32% improvement in power source efficiency for minimal cost or reduced cost. This is especially important in electric candles where additional components are desired such as infrared or a Bluetooth transceiver. With respect to the remaining numerals in FIG. 8, the same considerations for like components with like numerals of FIG. 7 apply.

The inventors additionally contemplate at least seven different other techniques to improve efficiency of an LED driver circuit. The first technique uses a transformer to measure the current through the circuit. The second technique measures the voltage drop across the switching transistor. The third technique involves determining the internal resistance of the battery to calibrate the amount of current passing through the LED. The fourth technique involves measuring the brightness of the LED and adjusting the voltage of the circuit until the desired brightness is reached. The fifth technique involves measuring the voltage drop across the LED to measure LED current. The sixth technique involves measuring voltage using a hall effect sensor in conjunction with a coil. And the seventh technique involves using a sense resistor to calibrate a PWM (e.g., to adjust the effective voltage or current) and then shorting out the sense resistor after adjusting the PWM. The different techniques to improve energy efficiency in LED driving circuits that are disclosed in this application can result in improvements of 30% or more.

For any of the seven techniques mentioned above (and for any of the other systems and methods described in this application) the amount of current supplied to the LED can be adjusted at different time intervals. For example, the circuit can adjust the current every 1-2, 2-3, 3-4, or 4-5 seconds. In some embodiments, the adjustment rate can be dramatically lower with the circuit adjusting current output every few milliseconds (1-10 ms, 11-20 ms, 21-30 ms). In still further embodiments, the adjustment can occur on larger time scales such as 1-2 minutes, 2-5 minutes, 5-10 minutes, and so on.

Any combination of the above disclosed current adjustment time intervals can be combined in some embodiments (this paragraph additionally applies to any other discussion of periodic adjustments or time intervals in this application). For example, a circuit of the inventive subject matter can adjust using shorter intervals (e.g., any of the intervals described above) for a set number of adjustments or for a set amount of time, and then subsequently adjust using relatively longer intervals (e.g., any of the intervals described above that is longer than the previously implemented interval). More than two intervals can also be implemented in some embodiments. Having a short interval to start off, followed by longer adjustment interval (or intervals), can improve the ability of the circuit to quickly converge on a configuration where current to the LED is near an ideal magnitude, while still enabling the circuit to adjust for long term changes such as voltage droop caused by battery drain (e.g., short intervals for quick convergence and long intervals for graduate changes). Adjusting current output only at desired times enables a circuit to minimize energy waste and allows the circuit to compensate for gradual voltage loss due to battery drain.

The inventors contemplate that any of the techniques mentioned above, or otherwise described in this application, can be used in LED driving circuits of the inventive subject matter in many different products, circuits, devices, etc. For example, the LED driving circuit can be implemented in electronic candles that use an LED to shine a light onto a flame element and an inductor to cause that flame element to move (e.g., to simulate the flickering of a real candle). Some embodiments of LED driving circuits as described in this application are used in conjunction or association with buck/boost circuits (e.g., the LED driving circuit is itself a buck/boost circuit with one or more additional features designed to reduce power consumption). Buck/boost circuits often include an inductor (which can be used to drive movement in a flame element of an electronic candle), and that inductor can be incorporated into the LED driving circuit advantageously so that the two circuits can share one or more components (e.g., the circuits can share an inductor, one or more transistors, etc.).

Figure 9:
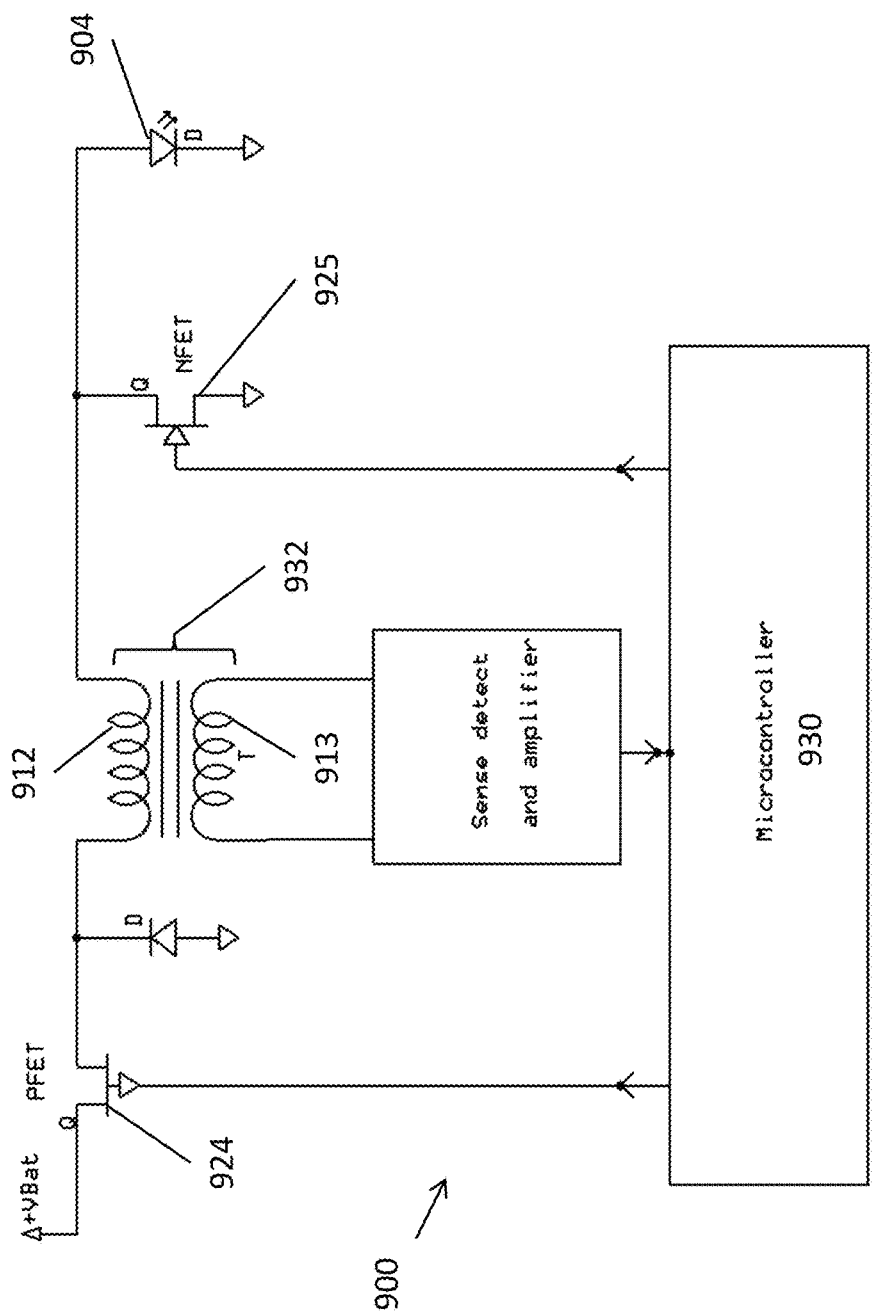
FIG. 9 illustrates an LED driving circuit capable of reducing energy usage by incorporating a transformer to determine the amount of current passing to an LED.

FIG. 9 depicts a schematic of a circuit 900 implementing the first technique of reducing energy usage in an LED driving circuit by incorporating a transformer 932. The transformer 932 enables determination of the amount of current passing through the LED 904. In typical LED driving circuits, a sense resistor is used to enable sensing of the current passing through the LED, but sense resistors waste power, typically on the order of 1.5 mW for a 12 mA average LED current for a 10Ω sense resistor. That amounts to about 4% of the LED power being wasted.

Broken down, the first technique for reducing energy consumption involves circuit 900 having at least one transistor 924, 925 and at least two coils 912, 913. Essentially, the coils 912, 913 create transformer 932, where the first coil 912 can be a part of, for example, a buck/boost circuit (or just one or the other) and the second coil 913 produces a voltage as the current through the first coil 912 is switched on and off by switching the transistor on and off (e.g., by switching off either the first or the second transistor 924, 925 in circuit 900, depending on the mode of the circuit). Voltage in the second coil 913 is measured (and amplified where necessary to enable measurement) such that a microcontroller 930 (or other suitable component) can detect that voltage. In some embodiments, signal from the second coil 913 is rectified and/or filtered so that the signal can effectively be used to sense current.

Such configuration advantageously results in lower power use than traditional sense resistor methods, as no resistive components are used to sense LED current. By detecting the voltage or current in the second coil 913, current in the LED 904 can thereby be determined. A known LED current allows the microcontroller 930 to adjust the duty cycle of the transistor to adjust the current through the LED 904 to converge on a desired current depending on the LED 904 in use in the circuit 900. This enables energy consumption optimization without requiring a sense resistor that would otherwise waste energy.

In some embodiments, the transformer 932 can implement a winding ratio to amplify the signal (e.g., the voltage/current generated in the second coil 913) to facilitate measurement. By measuring the output from the transformer 932, current through the LED 904 can be determined, and a PWM's duty cycle can be modulated so that a desired amount of current is provided to the LED 904 to produce a desired LED brightness.

In the second technique to reduce power consumption in an LED driving circuit, a voltage drop across a transistor is measured. This technique also obviates the need for a sense resistor, which improves efficiency by reducing power consumption. For example, buck/boost circuits, such as the one shown in FIG. 10, implement at least one transistor. For example, a buck only implementation require just one switch/FET transistor 1002 (shown in FIG. 10 without including the portions in dotted lines), while buck-boost implementations require at least two switches/FET transistors 1002, 1003 (shown in FIG. 10 including the portions in dotted lines).

When a transistor is activated (i.e., fully saturated), it provides a known resistance. Thus, by measuring the voltage drop across the drain and source terminals of a transistor, the current passing through that transistor can be determined. Applied to circuit 1000, knowledge of the amount of current passing through a transistor makes determination of the amount of current passing through the LED 1004 possible through the use of Ohm's law. Knowledge of the amount of current passing through the LED 1004 can be used to adjust the LED current to a desired level (e.g., by using a PWM or other component to adjust the current passing through the circuit). A desired amount of current can be based on, for example, a desired LED brightness or a desired LED current/voltage. With respect to the remaining numerals in FIG. 10, the same considerations for like components with like numerals of FIG. 7 apply.

FIG. 11 presents a graph demonstrating the relationship between drain current and transistor drain-source on-resistance. When the transistor is fully saturated, the drain to source resistance is flat at lower current levels. Knowledge of these transistor characteristics is important for the second technique.

In the third technique to reduce energy consumption in an LED driving circuit, the internal resistance of the power source (e.g., a battery) is determined. Power sources such as batteries can be modeled as having an internal equivalent resistance, and when the battery current draw changes, the output voltage changes proportionally according to that internal equivalent resistance. As a battery drains, the current it outputs drops and so does the voltage potential between its anode and cathode. With knowledge of the internal equivalent resistance of the battery and its open circuit (no load) output voltage, the LED current can be determined by drawing a known current from the battery, measuring the battery voltage, switching the LED on, and then again measuring the battery voltage.

Figure 12:
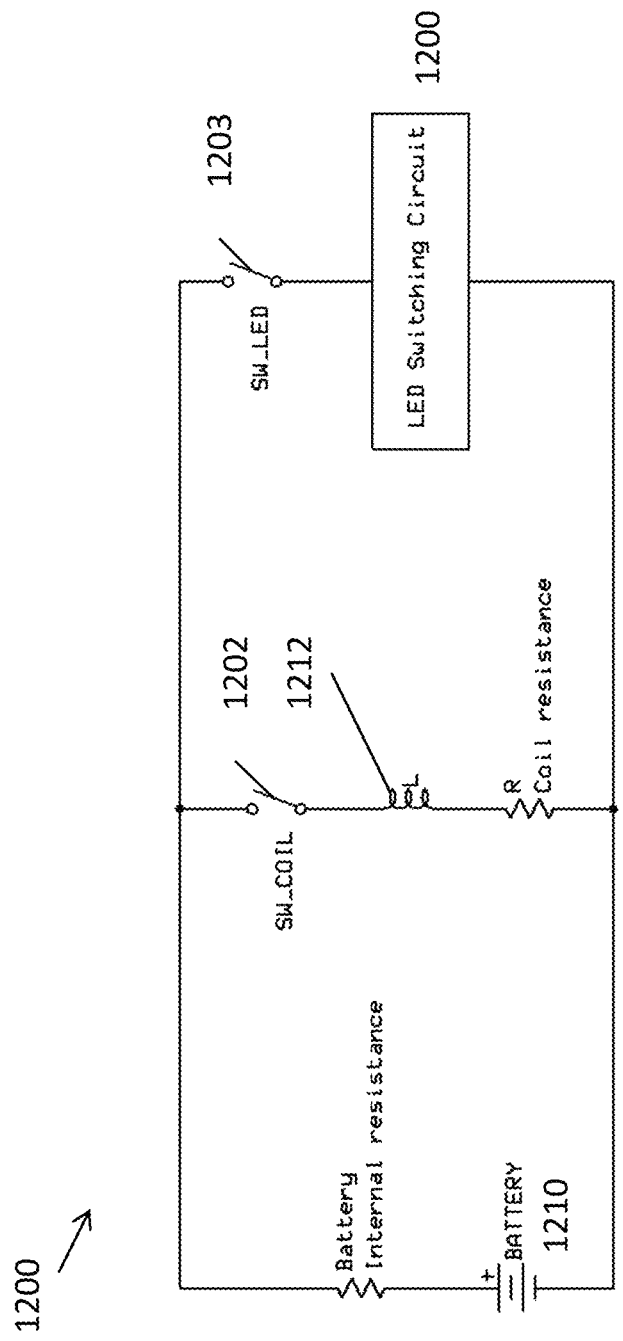
FIG. 12 illustrates an LED driving circuit capable of reducing energy usage using knowledge of the internal equivalent resistance of the battery.

FIG. 12 shows one possible circuit 1200 implementing the third technique described above. Essentially, the coil 1212 has a known resistance (or impedance, depending on the conditions in the circuit), is stable at all operating temperatures, and demonstrates consistent resistive values. By synchronously switching the coil 1212 (e.g., using a PWM) out of phase with the LED 1204 (which can also be switched on and off by, for example, a PWM), two different battery voltages can be measured. Knowledge of the different battery voltages can be used to determine the amount of current passing through the LED, and the switches 1202, 1203 can be activated and deactivated (e.g., by using one or more PWMs) to adjust the amount of current provided to the LED 1204.

The process for implementing the third technique involves three steps. First, the battery voltage is measured with both switches 1202, 1203 open. Second, the battery voltage is measured when only the coil switch 1202 is closed (and the LED switch 1203 open). Third, the battery voltage is measured with only the LED switch 1203 closed (and the coil switch 1202 open). With these three measurements, the battery 1210 internal resistance can be determined, the LED current can be determined, and the LED 1204 can then be driven using a desired amount of current.

The fourth technique for reducing energy consumption in an LED driving circuit requires measuring the brightness of the LED. For this technique, the brightness of the LED is directly measured (e.g., by using a photosensitive electronic component such as a photoresistor, a photoresistive sensor, a photo diode, a photo transistor, a camera, or any other imaging device known in the art), and then the voltage/current to the LED is adjusted until the desired brightness is reached.

Figure 13:
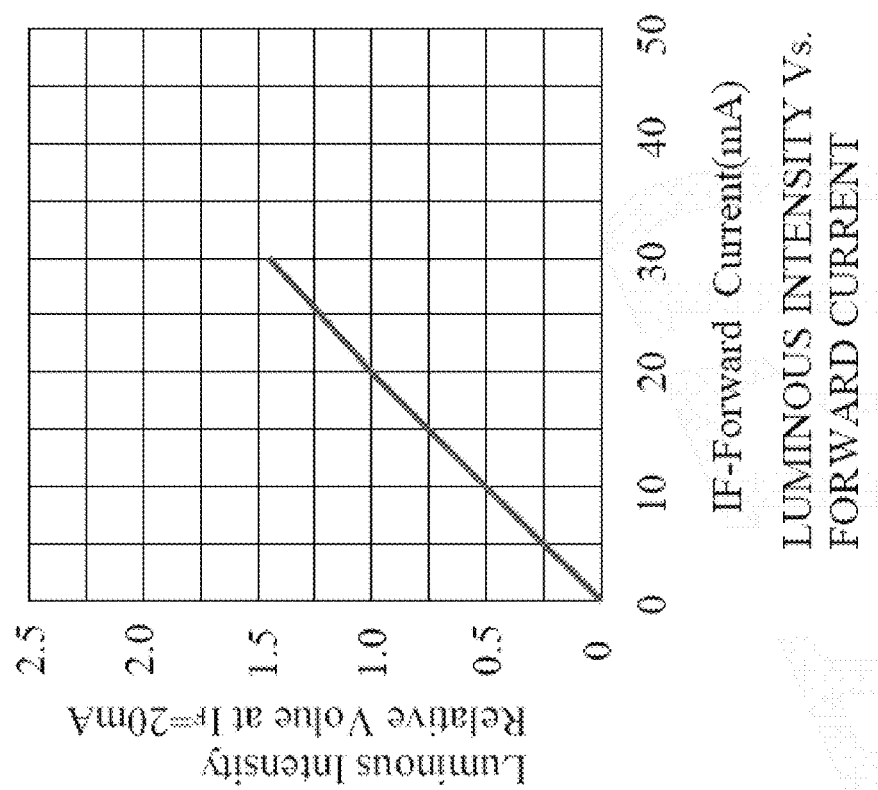
FIG. 13 is a graph demonstrating the relationship between LED current and LED brightness.

Since LED current can be modeled as being proportional to LED brightness (as shown in FIG. 13), LED current can be determined given a brightness measurement (though some factory calibration may be required).

Figure 14:
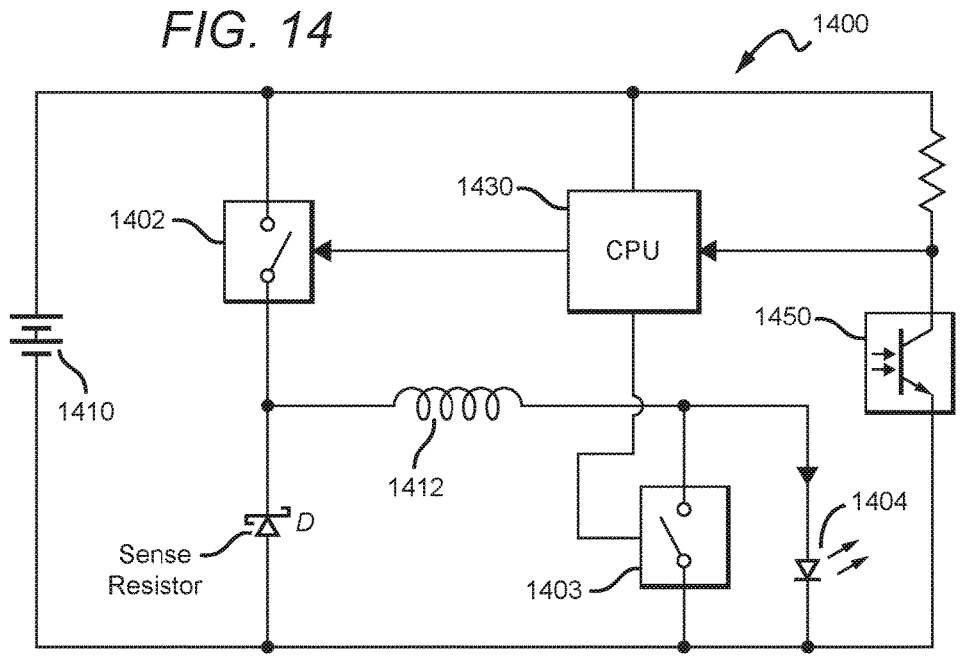
FIG. 14 illustrates an LED driving circuit capable of reducing energy usage by implementing a photosensor to detect LED brightness, which can then be adjusted.

FIG. 14 shows an example circuit 1400 comprising a photosensor 1450 to measure the brightness of the LED 1404. By measuring brightness, LED voltage can be determined, and given the voltage across the LED 1404, current through the LED 1404 can be determined. The circuit 1400 can then be adjusted to cause a desired amount of current to flow to the LED 1404 to produce a desired brightness. With respect to the remaining numerals in FIG. 14, the same considerations for like components with like numerals of FIG. 7 apply.

Figure 16:
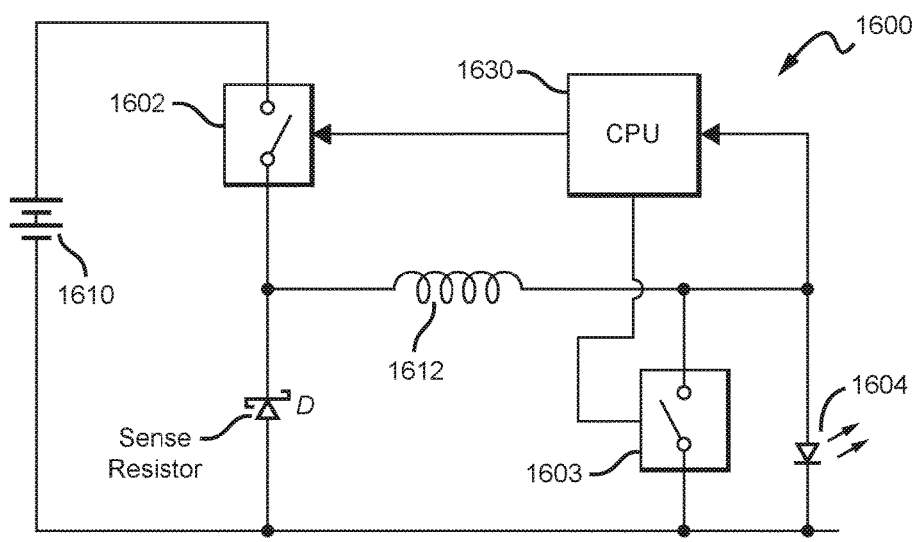
FIG. 16 illustrates an LED driving circuit capable of reducing energy usage by measuring a voltage drop across an LED to determine LED current.
Figure 15:
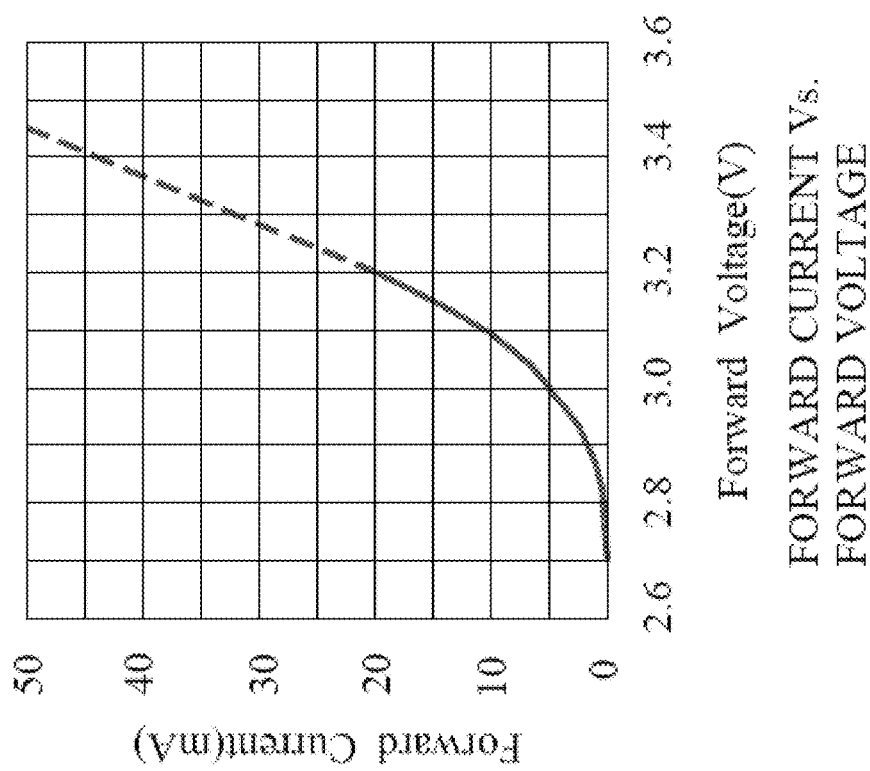
FIG. 15 is a graph showing LED forward current versus forward voltage graph (for the Mason Technologies 03W4Z2E92KC12-02-A candle LED).

The fifth technique involves measuring the voltage drop across the LED to measure LED current. Although the voltage drop across an LED is non-linear, that voltage drop can still can be used to determine the LED current for purposes of the inventive subject matter in this application. FIG. 15 shows an example LED forward current versus forward voltage graph (for the Mason Technologies 03W4Z2E92KC12-02-A candle LED), which can be used in conjunction with circuit 1600, shown in FIG. 16, to create an energy efficient LED driving circuit. Monitoring voltage during the switch on time after current flow is established allows the current to be determined using either a published transfer function or an experimentally derived data transfer function. With respect to the remaining numerals in FIG. 16, the same considerations for like components with like numerals of FIG. 7 apply.

Figure 17:
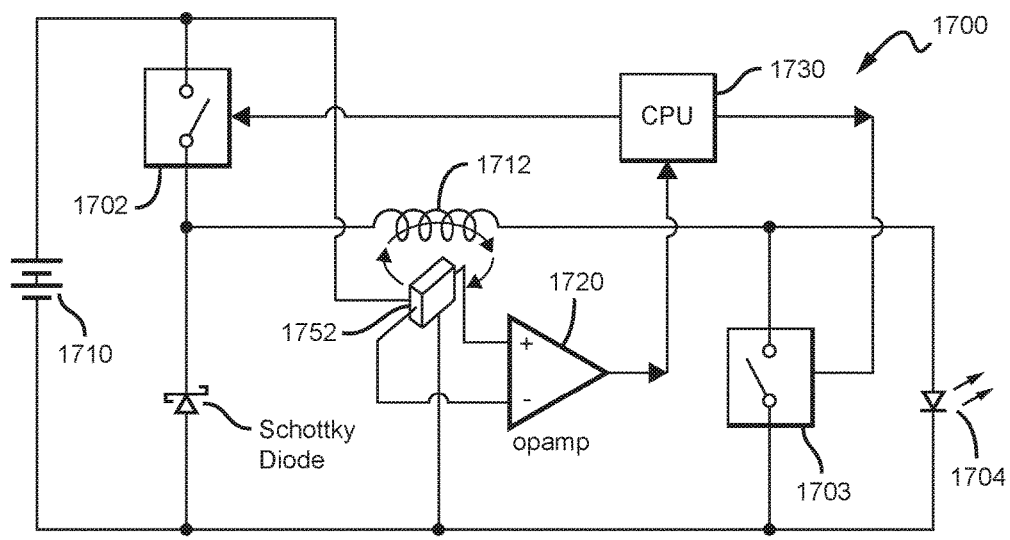
FIG. 17 illustrates an LED driving circuit capable of reducing energy usage by implementing a Hall effect sensor to bring about a reduction in energy consumption.

The sixth technique for reducing energy consumption in an LED driving circuit involves implementing a Hall effect sensor. Hall effect sensors output a voltage in response to a magnetic field. By measuring the magnetic field produced by, for example, the inductor in a buck/boost circuit, a Hall effect sensor could be used to compute the LED current. The greater the magnetic field measured, the greater the LED current. In practice, any of the circuit components are in series with the LED can produce a magnetic field that a Hall effect sensor can measure, but in buck/boost circuits, for example, the inductor would generate a larger magnetic field than any of the other components, making it the best candidate for Hall effect sensor measurement. FIG. 17 shows an example circuit 1700 implementing a Hall effect sensor 1752 to reduce energy consumption. With respect to the remaining numerals in FIG. 17, the same considerations for like components with like numerals of FIG. 7 apply.

Figure 18:
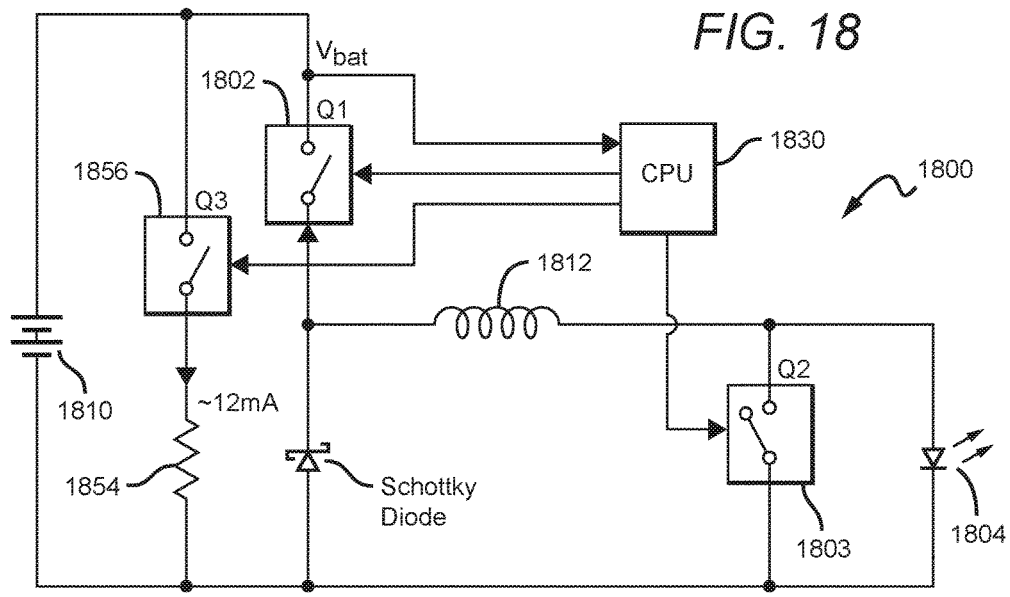
FIG. 18 illustrates an LED driving circuit capable of reducing energy usage by implementing a sense resistor that can be cut out of the circuit using a switch.

The seventh technique to reduce power consumption in an LED driving circuit uses a sense resistor like a more traditional LED driving circuit, but the sense resistor can be cut out of the circuit using a switch. An example circuit 1800 is shown in FIG. 18. Using this technique, a PWM or similar component can be calibrated based on voltage readings from the sense resistor 1854, and after the sense resistor is used to calibrate the PWM, it can then be shorted out of the circuit 1800 to reduce power consumption. This operation can be repeated periodically to converge toward providing an optimal amount of current for the LED 1804. This operation also helps to compensate for voltage drop that occurs as the battery 1810 drains.

In preferred embodiments, the sense resistor 1854 is shorted out using a transistor 1856. When the sense resistor 1854 is shorted out of the circuit, the overall power usage of the circuit 1800 goes down accordingly. The sense resistor 1854 is preferably shorted out more often than not, and it can be activated, for example, every several seconds (e.g., every 1-2, 2-3, 3-4, 4-5, or 5-6 seconds) by switching the state of a transistor 1856. When the sense resistor 1854 is active, the voltage drop across it is measured. After measurement, the transistor's state is switched again to effectively remove the sense resistor from the circuit. The PWM is then adjusted (e.g., the duty cycle and/or frequency is altered) to reduce or increase the current flowing to the LED 1804 as needed to provide a desired amount of current to the LED 1804 (e.g., enough current to cause the LED 1804 to light up). With respect to the remaining numerals in FIG. 18, the same considerations for like components with like numerals of FIG. 7 apply.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An electric candle powered by a stored power source, comprising:
   an inductor;
   a light source;
   a circuit coupled to a battery that is configured to power the light source, wherein the circuit comprises:
   a switch coupled with the light source and configured to permit current to pass through the inductor and the light source when the switch is closed;
   a resistor coupled with the light source; and
   a comparator coupled with the resistor and a processor, wherein the comparator controls a current flow to the light source by comparing an average voltage of the resistor to a digital-to-analog convertor output received from the processor to produce a comparison signal;
   wherein the processor is configured to receive the comparison signal and control the switch to modify the current flow as a function of the comparison signal, to maintain a predefined brightness of the light source as a voltage of the stored power source decreases.

2. The circuit of claim 1, wherein the light source comprises a LED.

3. The circuit of claim 1, wherein the light source is driven in a constant current mode.

4. The circuit of claim 1, wherein the light source comprises a plurality of LEDs arranged in parallel.

5. The circuit of claim 1, further comprising the processor coupled with the comparator.

6. The circuit of claim 5, wherein the switch is modulated by the processor.

7. The circuit of claim 1, further comprising a fixed resistor divider coupled with the comparator.

8. The circuit of claim 1, further comprising a coil coupled with the light source.

9. The circuit of claim 1, further comprising a second switch coupled with the light source.

10. The circuit of claim 9, wherein the processor is coupled with the second switch, and modulates opening and closing of the second switch to change a voltage received by the light source.

11. The circuit of claim 9, wherein the processor modulates the second switch.

12. The candle of claim 1, wherein the inductor configured to cause a flame element of the candle to move, and the light source shines light on to the flame element.

* * * * *